United States Patent
Harich et al.

(10) Patent No.: US 7,757,643 B2
(45) Date of Patent: Jul. 20, 2010

(54) DEVICE FOR REGULATING AN AIR FLOW FOR ENGINE COOLING

(75) Inventors: Martin Harich, Ludwigsburg (DE); Eberhard Pantow, Möglingen (DE); Michael Spieth, Gomaringen (DE)

(73) Assignee: BEHR GmbH & Co. KG, Stuttgart (DE)

( * ) Notice: Subject to any disclaimer, the term of this patent is extended or adjusted under 35 U.S.C. 154(b) by 186 days.

(21) Appl. No.: 11/652,641

(22) Filed: Jan. 12, 2007

(65) Prior Publication Data

US 2007/0169725 A1  Jul. 26, 2007

(30) Foreign Application Priority Data

| Jan. 12, 2006 | (DE) | .................. 10 2006 001 797 |
| May 30, 2006 | (EP) | ............................ 06011097 |
| May 30, 2006 | (EP) | ............................ 06011098 |

(51) Int. Cl.
  *F01P 7/02* (2006.01)
  *F01P 7/10* (2006.01)

(52) U.S. Cl. .............. 123/41.04; 123/41.05; 123/41.49; 165/98

(58) Field of Classification Search ... 123/41.04–41.07, 123/41.49; 236/35.2, 35.3; 165/98, 99
See application file for complete search history.

(56) References Cited

U.S. PATENT DOCUMENTS

| 1,114,246 | A | * | 10/1914 | Furbger | ................. 236/35.2 |
| 1,705,710 | A |   | 3/1929  | Bindon  |  |
| 1,737,946 | A | * | 12/1929 | Rood    | ................. 165/98 |
| 3,777,808 | A | * | 12/1973 | Izumi   | ................ 165/271 |
| 6,532,909 | B2 |  | 3/2003  | Stauder et al. |  |
| 6,800,385 | B2 |  | 10/2004 | Harth |  |
| 2005/0279113 | A1 |  | 12/2005 | Hoshi et al. |  |
| 2006/0211364 | A1 |  | 9/2006  | Brotz et al. |  |

FOREIGN PATENT DOCUMENTS

| DE | 318917 A | 2/1920 |
| DE | 2216585 A | 5/1973 |
| DE | 38 36 374 A1 | 1/1990 |
| DE | 43 04 336 A1 | 8/1994 |
| DE | 100 47 138 A1 | 4/2002 |
| DE | 102 35 192 A1 | 2/2003 |
| DE | 102 57 838 A1 | 7/2004 |
| DE | 103 06 158 A1 | 8/2004 |
| EP | 1 683 949 A1 | 7/2006 |
| FR | 2 738 779 A1 | 3/1997 |

* cited by examiner

*Primary Examiner*—Noah Kamen
(74) *Attorney, Agent, or Firm*—Foley & Lardner LLP

(57) ABSTRACT

A device for regulating an air flow for engine cooling, is disclosed herein with a fan element arranged over part of a heat exchanger face which can be traversed by air, and a covering element over a further part of the exchanger face, the covering element extending from the fan element up to an end of the exchanger face, and able to be at least partially selectively opened to allow air to flow through. A device providing an improved efficiency of the heat exchanger in at least one operating state of a motor vehicle is provided that is possible for a first opening section, which, in order to avoid excessive recirculation, is at a minimum distance from the fan element, the covering element is selectively opened and it is possible for at least one second opening section which substantially adjoins the fan element to be selectively opened.

24 Claims, 5 Drawing Sheets

DEVICE FOR REGULATING AN AIR FLOW FOR ENGINE COOLING

The right of foreign priority is claimed under 35 U.S.C. §119(a) based on European Application No. 06 011 097.0, filed May 30, 2006; European Application No. 06 011 098.8 filed May 30, 2006, and Federal Republic of Germany Application No. 10 2006 001 797.8 filed Jan. 12, 2006, the entire contents of which, including the specifications, drawings, claims and abstracts, are incorporated herein by reference. The entire contents, including the specification, drawings, claims and abstract, of Federal Republic of Germany Application No. 10 2005 025 081.5 filed May 30, 2005, are incorporated herein by reference.

The invention relates to a device for regulating an air flow for engine cooling.

BACKGROUND

In the design of motor vehicles having internal combustion engines, there is the problem that the air throughput through a given main radiator of the vehicle engine must be sufficient in all driving situations. In the process of saving weight, and in particular in the course of demanding an improved level of pedestrian impact protection, it is generally sought to reduce the size of main radiators while maintaining the heat exchanger power. This makes it necessary to optimize the air throughflow through the exchanger face in all operating states if possible. It is known for this purpose to cover a surface of the heat exchanger with a fan cowling, with an electrically driven fan being provided in one region of the fan cowling and flaps which can be opened being provided in another region of the fan cowling. The flaps which can be opened can, depending on the embodiment, be formed as ram pressure flaps or as actively actuable flaps. In the case in which no flaps are provided, the air flow is impeded at relatively high speeds, since the running fan is overblown and there can be no additional air mass flow rate as a result of ram pressure loading. The provision of ram pressure flaps—which are usually arranged horizontally—results at least in a high degree of resistance in partially-open operation, with heated air at least partially flowing back or being recirculated into the suction region of the fan. Such recirculation fundamentally reduces the efficiency of the heat exchanger. There are therefore often limits to the efficiency, both in the case of passive ram pressure flaps and in the case of actively controlled flaps, as a result of intense recirculation effects.

SUMMARY

It is an object of the invention to specify a device for regulating an air flow for engine cooling, which provides an improved degree of efficiency of the heat exchanger in at least one operating state of a motor vehicle.

By selectively opening the first opening section, which is spaced apart from the fan element, it is possible in a part-load range to provide a relative-wind-related additional flow through the heat exchanger, with the risk that the air which has flowed through said first opening section is recirculated into the fan element being considerably reduced at the same time. It is simultaneously possible, as a result of the possibility of selectively opening the second opening section, to provide relatively large-area throughflow in a relatively high load range such as full load, as is the case in the prior art. The efficiency of the heat exchanger is therefore improved overall, when considered over all operating states, by the device according to the invention.

In order to optimize the installation space and the air flow, the fan element can preferably be attached in a sucking arrangement.

In a first preferred embodiment, the covering element has a plurality of separately controllable flaps, so that the different opening sections can be opened in stages, for example by virtue of each of the flaps corresponding to one stage.

In the interest of a mechanically reliable and aerodynamically advantageous design, the flaps are formed in each case as two-part folding flaps.

In order to be adapted to the small installation spaces available in the majority of modern motor vehicles, the flaps are advantageously arranged laterally adjacent to the fan element, with the movement axes of the flaps being aligned in each case so as to be substantially vertical.

It is also preferable for a section which is permanently permeable to air to be provided between an end, which faces away from the fan element, of the exchanger face and the first opening section, in order to provide optimum adaptation to part-load operation. Here, it is particularly preferable for an air guide element for reducing recirculation to be provided in the region of the section which is permanently permeable to air. Said air guide element can for example be a directional guide plate and/or a blocking guide plate. Air guide elements of said type can also generally be arranged between the exchanger face and the flap elements.

In order to provide particularly effective adaptation to different driving states, the number of separately controllable flaps is at least three.

In a second preferred embodiment of the device according to the invention, the covering element is an in particular continuously displaceable, substantially planar element. The covering element is particularly preferably an elastic roller shutter which is preferably moveable in the horizontal direction. Overall, the provision of a generally continuously displaceable roller shutter of said type as a covering element permits particularly precise adaptation of the exposure of the exchanger face as a function of different driving states. The region in which the roller shutter initially exposes the exchanger face is expediently at a maximum distance from the fan element in order to keep the risk of recirculation, which exists in particular at low speeds, low.

In a further preferred embodiment, at least a part of the covering element comprises a plurality of moveable flaps, with the first opening section being formed by at least a first one of the flaps, and it being possible for at least two of the flaps to be opened with a delay relative to one another by means of a common control mechanism. This reduces the required number of force-introduction units in a simple and cost-effective manner.

Here, the plurality of flaps is preferably held, in particular as a separate structural unit, in a frame, as a result of which the covering element can be formed at least partially as a separate module.

It is also preferable for the control mechanism to comprise a rail having at least two differently-shaped slotted guides, with each of the slotted guides being assigned one of the flaps. The different slotted guides make it possible to provide a suitable control mechanism which is simple, reliable and of shallow design.

A drive force for moving the flaps can particularly preferably be introduced into only one end side of the flaps, rendering a complex mechanism for transmitting the force to the other end side, or a further separate force-introduction unit, obsolete.

The substantially vertical arrangement of the flaps permits a relatively high degree of flexibility for adaptation to the available installation spaces and air openings of modern motor vehicles. It is additionally possible for the weight forces of the flaps to be balanced out as a result of the flaps being aligned at least approximately in the direction of gravity. This makes it possible for the flaps to be aerodynamically designed with a greater degree of flexibility, and to use a more simple drive mechanism to adjust the flaps.

With regard to the features of dependent claims 2 to 15, reference is made to the corresponding advantages as stated above.

Further advantages and features emerge from the exemplary embodiments described in the following, and from the dependent claims.

BRIEF DESCRIPTION OF THE DRAWINGS

In the following, three exemplary embodiments of a device according to the invention are described and explained in more detail on the basis of the appended drawings.

DETAILED DESCRIPTION

Figure 1:
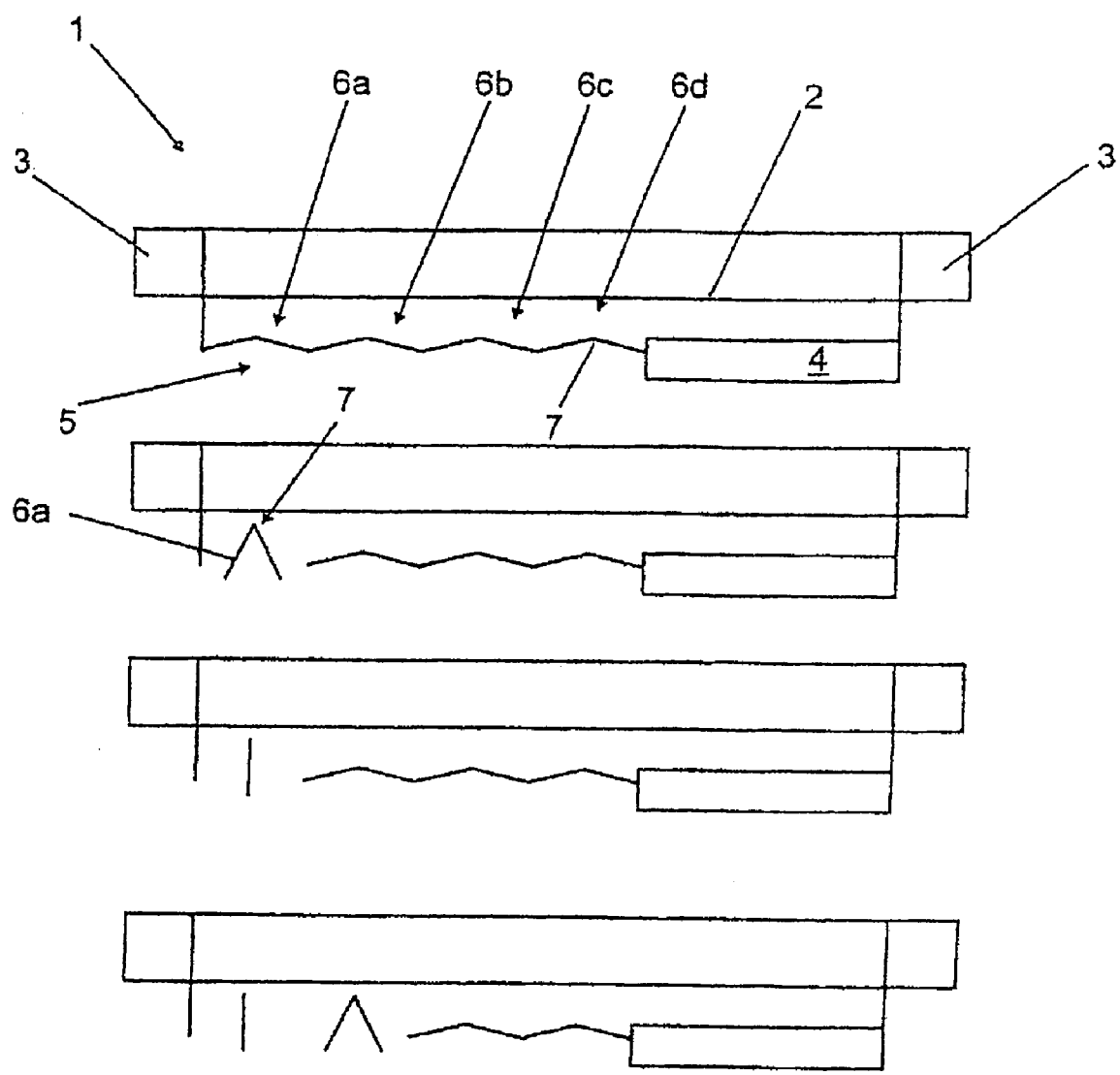
FIG. 1 shows a schematic view from above of a device according to the invention, with a plurality of states of increasing opening of the covering element proceeding from a completely closed covering element being illustrated.

FIG. 1 shows a heat exchanger 1 which has an exchanger face 2, with it being possible for air to pass through the heat exchanger 1 only via the exchanger face 2. The exchanger tubes (not illustrated) are arranged in the region of said throughflow or of the exchanger face, said exchanger tubes being traversed, proceeding from lateral collecting regions 3, by a coolant liquid, so that the heat of the coolant liquid is dissipated to the air flowing through.

An electrically driven fan element 4 is in a sucking arrangement, upstream of the heat exchanger 1, in a lateral region of the exchanger face 2. In the transverse direction of the heat exchanger 1, the fan element 4 extends over approximately one third of the length of the exchanger face 2.

Provided adjacent to the fan element 4 is a covering element 5 which covers that part of the exchanger face 2 which is not covered by the fan element 4. The covering element 5 in particular holds the fan element 4 in a corresponding recess in the manner of a fan cowling as is known per se.

The covering element 5 has four flaps 6a, 6b, 6c and 6d which are each formed in the manner of a two-part folding flap which comprises a flap axis 7, with the flap axis 7 extending into the drawing plane and therefore in the vertical direction with respect to the installation position of the device.

Each of the flaps 6a-6d can be opened separately. This takes place in a way known per se by means of respective actuators or adjusting members. It is also possible for a control mechanism to be provided which is actuated by only one actuator and opens a plurality of flaps sequentially one after the other, as illustrated.

With regard to the plurality of opening states of the covering element 5 illustrated in FIG. 1 sequentially from top to bottom, the invention functions as follows: When all of the flaps 6a-6d are in the closed position (upper figure), the fan 4 sucks air through the heat exchanger 1, with the substantially complete covering of the exchanger face 2 largely preventing heated air exiting the fan 4 from finding its way back into the air inlet. An efficiency-reducing recirculation of air is therefore largely avoided. The covering element 5 is usually in the completely closed position in an idle state of the vehicle in which there is no relative wind, so that the entire air throughput is provided by the fan element 4.

If, in a part-load range of the vehicle engine, a relatively high level of heat exchanger power is required at a specified, generally low driving speed, then initially the first flap element 6a, which is at a maximum distance from the fan element 4 as per FIG. 1, is opened, with it being possible as a result of the design of the flap elements for the opening to be only partial. As a result of the first flap element 6a being opened, a first opening section of the exchanger face is exposed for the passage of air, with said first opening section being at the greatest distance from the fan element 4 in comparison to the other flap elements 6b-6d. In said operating state, the fan element 4 is usually still switched on, and it is therefore desirable to avoid a recirculation. As a result of the relatively large distance of the first flap element 6a in comparison to the further flap elements 6b-6d, a recirculation is prevented or kept particularly small.

With further increasing load, as is generally associated with increasing driving speed, the further flap elements 6b-6d are also opened in succession, as is illustrated in the drawing of FIG. 1 only up to a partial opening of the second flap element 6b.

Figure 2:
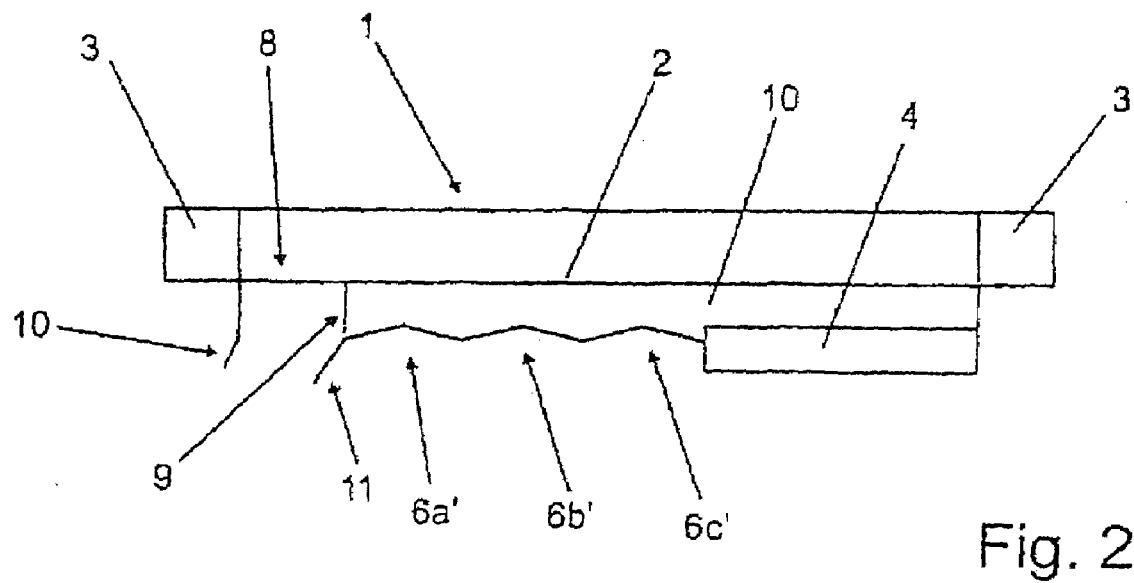
FIG. 2 shows a modification to the device from FIG. 1.

FIG. 2 shows a modification to the embodiment from FIG. 1, with a section 8 which is permanently permeable to air being provided between an edge 2a of the exchanger face 2 and a first folding flap 6a' which is at a maximum distance from the fan element 4, and with only three folding flaps 6a', 6b', 6c' being provided in total. This can be desirable for fine-tuning or else for avoiding an excessively large number of flaps.

In the present case, the given distance of the first flap element 6a' from the fan element 4 is sufficient to at least considerably reduce a circulation when only the first flap element 6a' is opened in the course of a part-load range. In order to give a further improvement, in the present case, a separating wall 9 is also provided which extends from the exchanger face 2 up to an end, which faces away from the fan element 4, of the flap element 6a', so that a largely closed volume 10, which is accessible only via the fan element 4, between the covering element 5 and the exchanger face 2 is provided by the closed flap elements 6a'-6c' in connection with the separating wall 9. An additional or alternative measure to the separating wall 9 for reducing a possible recirculation are air guide elements 10, 11 in the outlet region of the section 8 which is permanently permeable to air. Said air guide elements deflect the air flowing through the region 8 away from the fan element 4.

Figure 3:
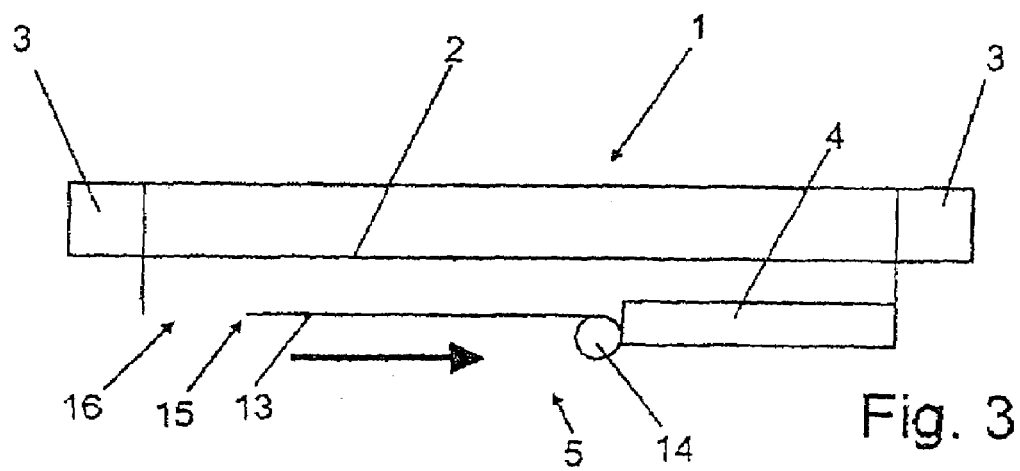
FIG. 3 shows a schematic view from above of a second embodiment of a device according to the invention.
Figure 4:
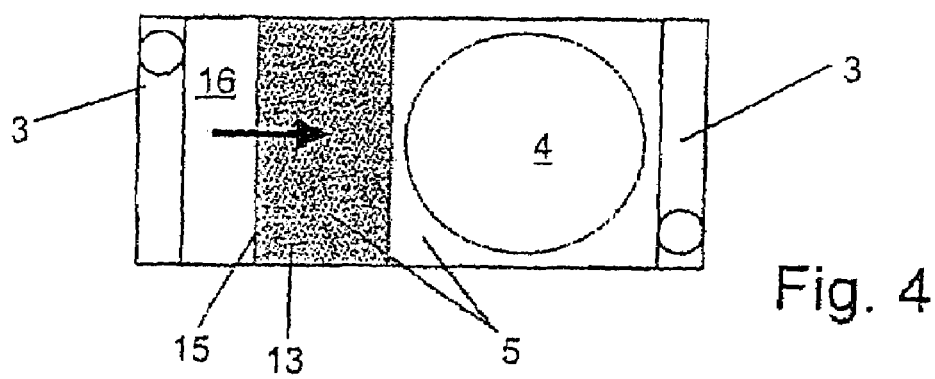
FIG. 4 shows the device from FIG. 3 from the front.
Figure 5:
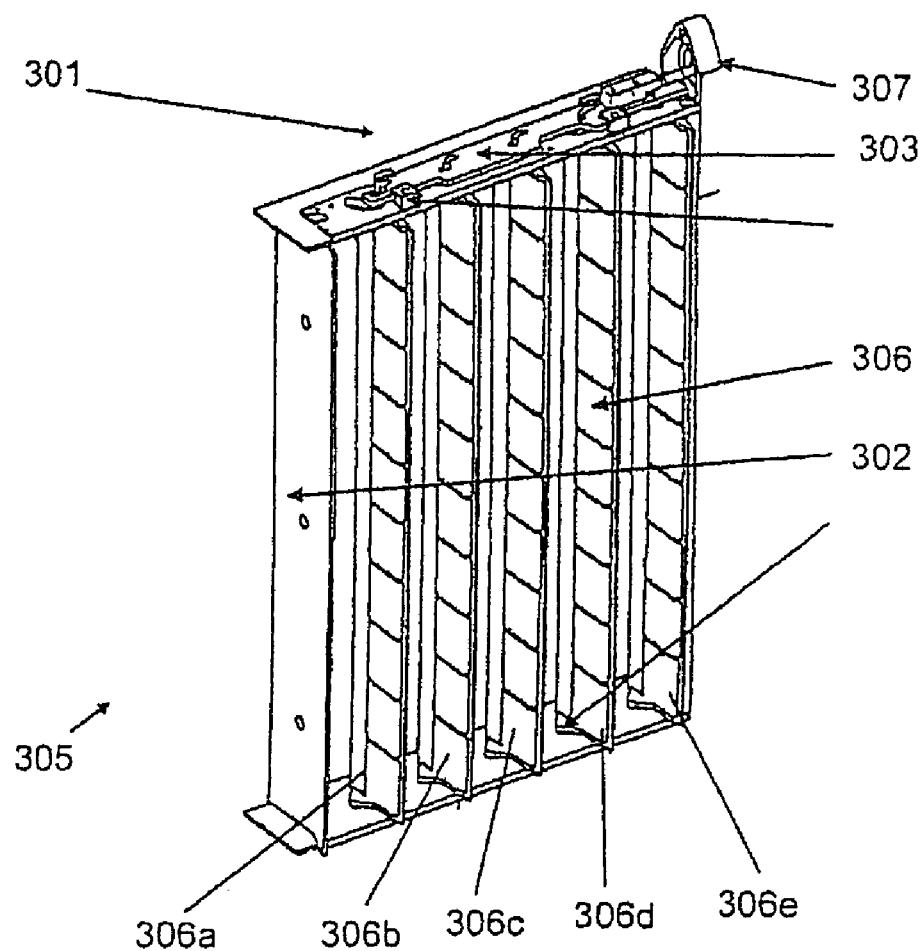
FIG. 5 shows a three-dimensional view of a covering element of a third exemplary embodiment of a device according to the invention.
Figure 6:
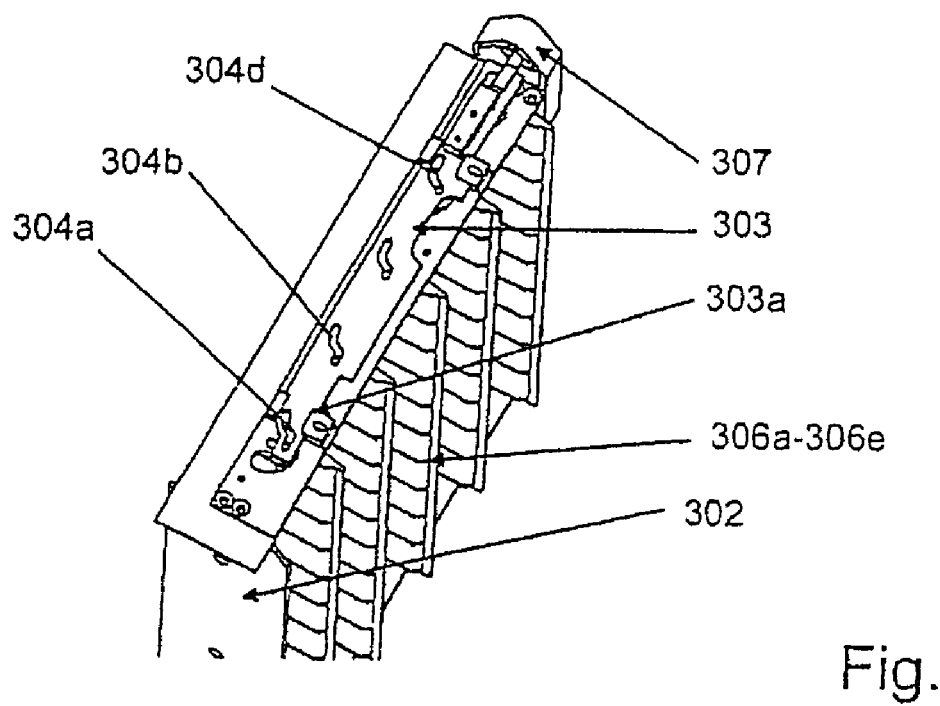
FIG. 6 shows the covering element from FIG. 5 from another perspective.

In the second exemplary embodiment according to the invention as per FIG. 3 and FIG. 4, the covering element 5 is formed not as a discrete number of rigid flap elements but as a roller shutter having a planar and elastic web 13 which can be wound around a roller 14. Here, the roller 14 is arranged adjacent to the fan element 4, so that one end 15 of the elastic web 13 is at a maximum distance from the fan element 4 in a completely closed state (not illustrated) of the roller shutter. It is possible for the exchanger face 2 to be exposed in a continuous manner by means of the roller shutter. In the drawings of FIG. 3 and FIG. 4, the roller shutter is in each case in a partially open state in which a first opening section 16 is exposed, so that the state shown corresponds to a part-load range of the vehicle engine, usually with low relative wind. As a result of the first opening section 16 being at a minimum distance from the fan element 4 as a result of the remaining area of the roller shutter between said first opening section 16 and the fan element 4, air which has flowed through the region 16 is largely prevented from being recirculated into the fan element 4. A second opening section for further, in particular complete exposure of the exchanger face 2 can be provided, for example, by completely rolling up the roller shutter. It is also possible in this way to obtain an optimum passage of air for example for a full-load range.

In the case of the third preferred exemplary embodiment as per FIG. 5 to FIG. 8, a covering element 305 is illustrated which is constructed as a modular unit or as a module. A further covering element within the context of the patent claims can, for example, be an adjoining frame for the fan (not illustrated).

Figure 8:
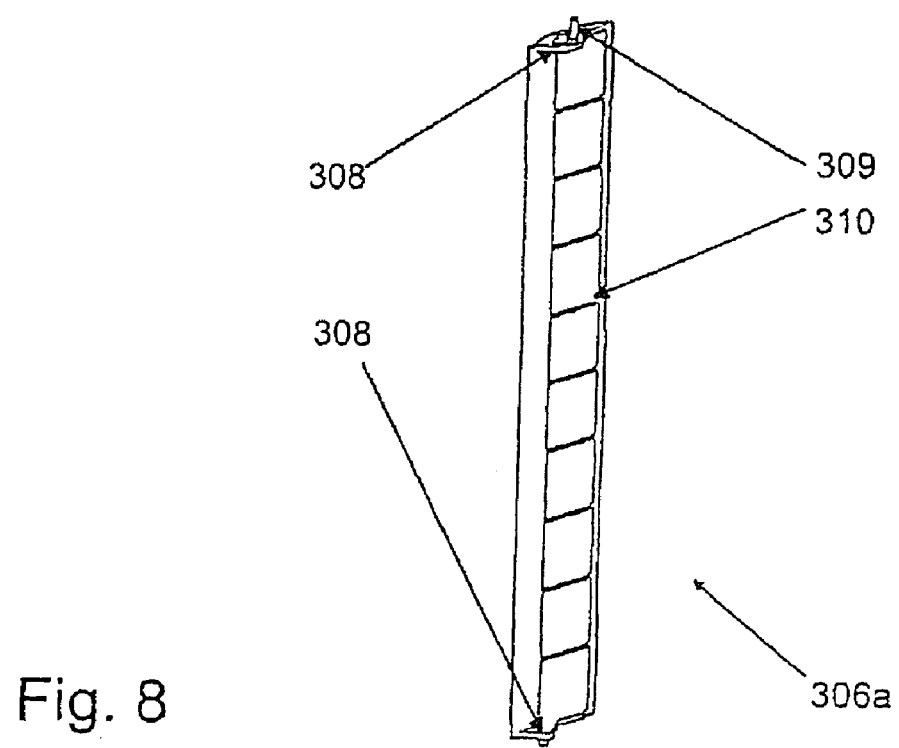
FIG. 8 shows a three-dimensional view of an individual flap of the covering element from FIG. 5.

The covering element of the third exemplary embodiment comprises five in each case moveable flaps 306a-306e which are rotatably mounted parallel to one another in a rigid frame 302 by means of rotary pins 308 at the end sides in each case (see FIG. 8). Depending on their rotary position, the flaps are therefore in an open, a partially open or a closed position in the frame 302. Each of the flaps has, on one end side, an actuating pin 309 which is offset relative to the rotary pin 308 and by means of which the respective flap can be adjusted with force assistance.

On the frame side of the actuating pin 309, a control rail 303 is guided in a linearly displaceable fashion in the frame 302 in guide blocks 303a. At the end of the rail 303, the latter is connected by means of rods to a linear actuator (not illustrated) which can be fixed in a bracket 307 and by means of which it is possible to adjust a position of the rail 303 relative to the frame 302. Here, all known and suitable drive devices are conceivable as an actuator.

The control rail 303 has five apertures 304a, 304b, 304c, 304d, 304e (see FIG. 7) which have a meandering profile in the manner of a slotted guide. One of the actuating pins 309 of the five flaps 306a-306e engages in each of the slotted guides 304a-304e.

Figure 7:
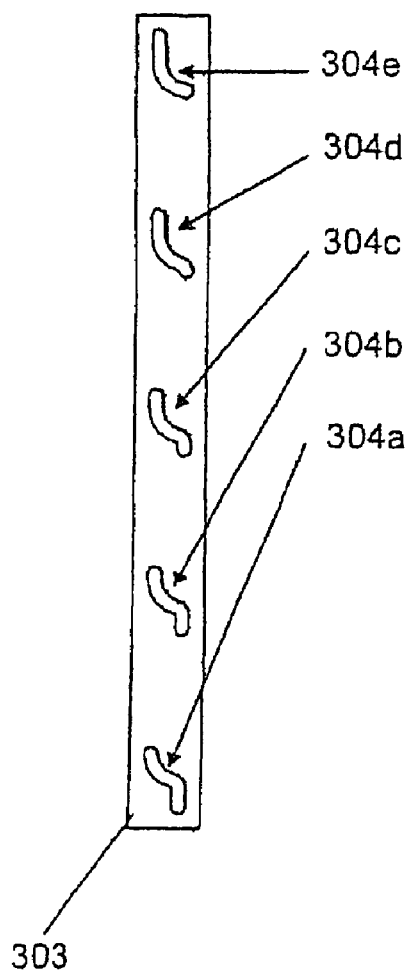
FIG. 7 shows a schematic plan view of a control rail of the covering element from FIG. 5.

It can be seen from the true-to-scale illustration of the slots in FIG. 7 that each of the slots 304a-304e has the same overall length in the movement direction of the rail and the same overall width perpendicular to the movement direction of the rail. In contrast, the slots are respectively different in that a curving part is provided at a different relative position in the longitudinal direction in each case.

Proceeding from the illustrated open position of the flaps 306a-306e, for the purpose of closing the covering element 305, the rail 303 is displaced with force assistance in its longitudinal direction. As a result, firstly the flap 306e is closed, whereas the other flaps do not yet move at the instant in which the rail 303 first moves. During the course of the closing movement of the flap 303e, the flap 306d is then moved on account of the shape of the slot 304d, until finally the first flap 306a is closed. In a corresponding manner, proceeding from the closed position (not illustrated), the flap 306a is firstly partially opened before the movement of the next flap 306b begins.

Each of the slots 304a-304e has a section which runs parallel to the longitudinal direction of the rail 303 and is assigned to an unchanged position of the respective flap during a movement of the rail 303. Said idle path can, for example, be 6 mm in the case of an overall path of the control rail of 18 mm. Other ratios of idle path to overall path are however conceivable depending on the degree to which the movement of the individual flaps should be delayed relative to one another.

In the present example, the flaps are each of identical design. In a further optimization of the covering element, they can however also each be aerodynamically optimized individually as a function of their position. The flaps 306a-306e are embodied as ram pressure flaps and are aligned vertically. The mass action is eliminated as a result of the vertical alignment. The ram pressure compensates the suction pressure of a fan, which is preferably in a sucking arrangement, to an increasing degree with increasing driving speed, so that, at a suitable opening instant, it is necessary to apply only a small force to substantially overcome the friction forces of the control mechanism 301.

For said reason, it is possible with little expenditure to design the mechanism to be sufficiently smooth-running such that the control mechanism need only engage, as illustrated, on one end side of the flaps. This permits a simple design with only one single actuator and in particular without an additional mechanism for transmitting force to the opposite side.

In a favourable aerodynamic embodiment, the flaps also have fins 310 which serve to provide improved guidance of the air flowing over the flaps, and if appropriate a reduction in noise.

Figure 9A:
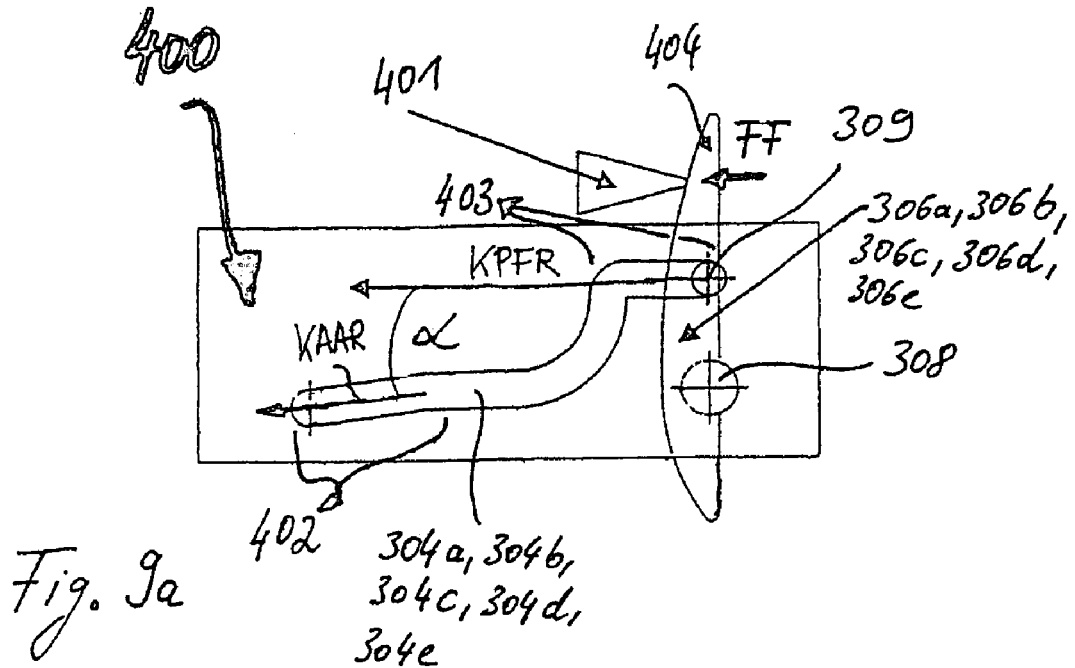
FIG. 9a shows a control rail with an open flap, with the position of the flap being fixed.

FIG. 9a shows a control rail 400 with at least one opened flap 306a, 306b, 306c, 306d, 306e, with the position of the at least one flap 306a, 306b, 306c, 306d, 306e being fixed. Identical features are provided with the same reference symbols as those in the preceding figures.

The control rail 400 has at least one slotted guide 304a, 304b, 304c, 304d, 304e which is formed in the control rail 400. An actuating pin 309 of at least one flap 306a, 306b, 306c, 306d, 306e is guided in the control rail, with it being possible in this way for the at least one flap 306a, 306b, 306c, 306d, 306e to be moved from one flap position 404 into at least one second flap position 405.

In the illustrated exemplary embodiment, the at least one flap 306a, 306b, 306c, 306d, 306e is situated in the first flap position 404. In said flap position, air can flow through at least one opening section of the exchanger face of the at least one heat exchanger. In the flap position 404, the actuating pin 309 is situated in a flap position fixing section 403 of the slotted guide 304a, 304b, 304c, 304d, 304e. In another embodiment, the fixing of the at least one flap 306a, 306b, 306c, 306d, 306e can be further improved by means of a fixing element 401. Here, the fixing element 401, in particular a stop, exerts at least one force on the at least one flap 306a, 306b, 306c, 306d, 306e, and said force generates a counterforce, the fixing force FF, which acts on the fixing element 401 with the same magnitude as and in the opposite direction to the force on the flap.

As a result of the flap position fixing section 403 and/or as a result of the fixing element 401, the play of the flaps 306a, 306b, 306c, 306d, 306e is reduced, and the latter can no longer flutter. Fluttering of the at least one flap 306a, 306b, 306c, 306d, 306e causes an increased flow resistance of the flaps and leads to wear of the at least one flap. In addition, fluttering noises of the at least one flap are prevented as a result of the flap position fixing section 403 and/or as a result of the at least one fixing element 401.

Figure 9B:
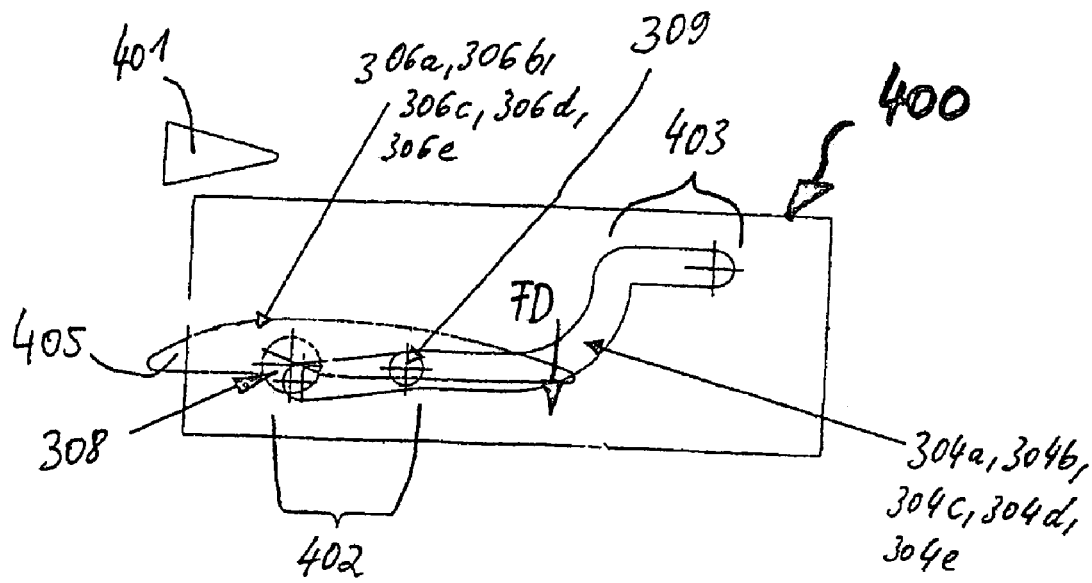
FIG. 9b shows a control rail with a closed flap, with the flap being fixed in a position in which the flap seals off the opening section of the exchanger face so as to prevent a passage of air.

FIG. 9b shows a control rail 400 with a closed flap 306a, 306b, 306c, 306d, 306e, with the flap 306a, 306b, 306c, 306d, 306e being fixed in a second flap position 405 in which the flap 306a, 306b, 306c, 306d, 306e seals off the opening section of the exchanger face so as to prevent a passage of air; a passage of air through the opening section is thereby prevented. Identical features are provided with the same reference symbols as those in the preceding figures.

In the illustrated exemplary embodiment, the at least one flap 306a, 306b, 306c, 306d, 306e is situated in the second flap position 405. In said flap position, no air can flow through the at least one opening section of the exchanger face of the at least one heat exchanger. In the flap position 405, the actuating pin 309 is situated in a flap sealing section 402 of the slotted guide 304a, 304b, 304c, 304d, 304e.

In another embodiment, the fixing of the at least one flap 306a, 306b, 306c, 306d, 306e in the sealing position 405 is further improved by the fixing element 401 and/or by a further fixing element (not illustrated in any more detail). When providing sealing, the at least one flap 306a, 306b, 306c, 306d, 306e exerts a sealing force FD on at least one further flap and/or on at least one frame element (not illustrated).

The sealing force FD is increased as a result of the flap sealing section 402 and/or as a result of the fixing element 401. This reduces leakage, that is to say the passage of air through the exchanger opening section. The thermal output dissipated at standstill, in particular at low vehicle speeds, is thereby increased. In addition, the play of the flaps 306a, 306b, 306c, 306d, 306e is reduced or even eliminated. The wear of the flaps 306a, 306b, 306c, 306d, 306e is reduced and fluttering noises are suppressed.

The at least one flap sealing section 402 with the flap sealing section direction KAAR is at an angle α to the flap position fixing section direction KPFR of the flap position fixing section 403. The angle α assumes values between 0° and 90°, in particular between 0° and 50°, in particular between 0° and 45°, in particular between 0° and 40°, in particular between 5° and 30°, in particular between 7° and 20°.

The invention claimed is:

1. A device for regulating an air flow for engine cooling, comprising:
   a fan element arranged over part of an exchanger face of a heat exchanger which can be traversed by air, and
   a covering element which is arranged over a further part of the exchanger face and which is arranged laterally adjacent to the fan element,
   wherein the covering element is able to be at least partially selectively opened in order to allow air to bypass the fan element and flow through, and
   wherein the covering element comprises a plurality of moveable flaps, and
   wherein the flaps are arranged so as to be substantially vertical,
   wherein at least some of the flaps can be controlled separately, and
   wherein the at least some of the flaps are configured to be actuated separately and independently from each of the other some of the flaps.

2. The device as claimed in claim 1, wherein the fan element is in a sucking arrangement.

3. The device as claimed in claim 1, wherein the flaps are formed in each case as two-part folding flaps.

4. The device as claimed in claim 1, wherein the flaps are arranged laterally adjacent to the fan element, with movement axes of the flaps being aligned in each case so as to be substantially vertical.

5. The device as claimed in claim 1, wherein a section which is permanently permeable to air is provided between an end, which faces away from the fan element, of the exchanger face and a first opening section of the covering element.

6. The device as claimed in claim 5, wherein an air guide element for reducing recirculation is provided in a region of the section which is permanently permeable to air.

7. The device as claimed in claim 1, wherein a number of the separately controllable flaps is at least three.

8. The device as claimed in claim 1, wherein a first opening section, in order to avoid excessive recirculation, is at a minimum distance from the fan element, of the covering element and is configured to be selectively opened, and wherein at least one second opening section substantially adjoins the fan element and is configured to be selectively opened.

9. A device for regulating an air flow for engine cooling, comprising:
   a fan element arranged over part of an exchanger face of a heat exchanger which can be traversed by air, and
   a covering element which is arranged over a further part of the exchanger face and which is arranged laterally adjacent to the fan element,
   wherein the covering element is able to be at least partially selectively opened in order to allow air to bypass the fan element and flow through,
   wherein the covering element comprises a plurality of moveable flaps,
   wherein the flaps are arranged so as to be substantially vertical, and at least some of the flaps can be controlled separately, and
   wherein the plurality of flaps is held as a separate structural unit in a frame.

10. The device as claimed in claim 9, wherein at least two of the flaps can be opened with a delay relative to one another by a common control mechanism.

11. The device as claimed in claim 9, further comprising a control mechanism, wherein the control mechanism comprises a rail having at least two differently-shaped slotted guides, with each of the slotted guides being assigned to one of the flaps.

12. The device as claimed in claim 9, wherein a drive force for moving the flaps can be introduced into only one end side of the flaps.

13. The device as claimed in claim 9, wherein the device has at least one element for positionally fixing at least one flap in at least one flap position and/or for sealing off the flaps.

14. The device as claimed in claim 9, wherein at least one slotted guide is formed at least in sections as a flap sealing section and/or as a flap position fixing section.

15. A device for regulating an air flow for engine cooling, comprising:
   a fan element arranged over part of an exchanger face of a heat exchanger which can be traversed by air, and
   a covering element which is arranged over a further part of the exchanger face and which is arranged laterally adjacent to the fan element,
   wherein the covering element extends from the fan element up to an end of the exchanger face, and
   wherein the covering element is able to be at least partially selectively opened in order to allow air to bypass the fan element and flow through, wherein a first opening section, in order to avoid excessive recirculation, is at a minimum distance from the fan element, of the covering element and is configured to be selectively opened, wherein at least one second opening section substantially adjoins the fan element and is configured to be selectively opened, wherein the covering element comprises a plurality of separately controllable flaps, and wherein at least some of the flaps are configured to be actuated separately and independently from each other.

16. The device as claimed in claim 15, wherein the fan element is in a sucking arrangement.

17. The device as claimed in claim 15, wherein the flaps are formed in each case as two-part folding flaps.

18. The device as claimed in claim 15, wherein the flaps are arranged laterally adjacent to the fan element, with movement axes of the flaps being aligned in each case so as to be substantially vertical.

19. The device as claimed in claim 15, wherein a section which is permanently permeable to air is provided between the end, which faces away from the fan element, of the exchanger face and the first opening section.

20. The device as claimed in claim 19, wherein an air guide element for reducing a recirculation is provided in a region of the section which is permanently permeable to air.

21. The device as claimed in claim 15, wherein a number of the separately controllable flaps is at least three.

22. A device for regulating an air flow for engine cooling, comprising:

a fan element arranged over part of an exchanger face of a heat exchanger which can be traversed by air, and a covering element which is arranged over a further part of the exchanger face and which is arranged laterally adjacent to the fan element, wherein the covering element extends from the fan element up to an end of the exchanger face, wherein the covering element is able to be at least partially selectively opened in order to allow air to bypass the fan element and flow through, wherein a first opening section, in order to avoid excessive recirculation, is at a minimum distance from the fan element, of the covering element and is configured to be selectively opened, wherein at least one second opening section substantially adjoins the fan element and is configured to be selectively opened, and wherein the covering element is a continuously displaceable, substantially planar element.

23. The device as claimed in claim 22, wherein the covering element is an elastic roller shutter.

24. The device as claimed in claim 22, wherein the roller shutter can move substantially in a horizontal direction.

* * * * *